July 4, 1939.  J. P. BURKE  2,164,382
NUT
Filed March 6, 1939  2 Sheets-Sheet 2
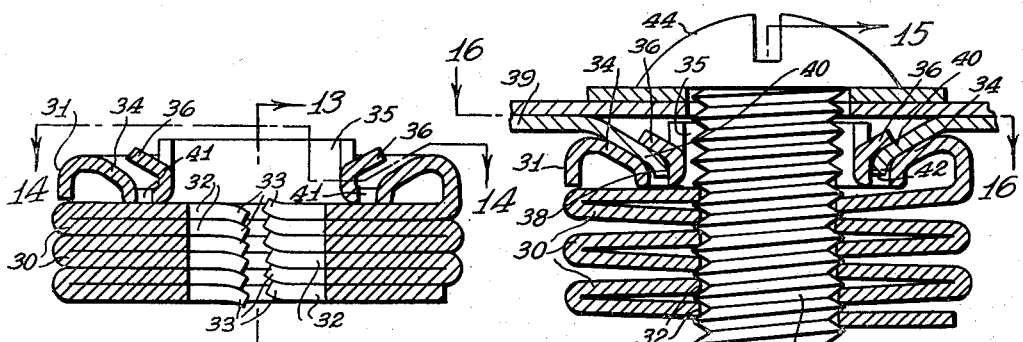
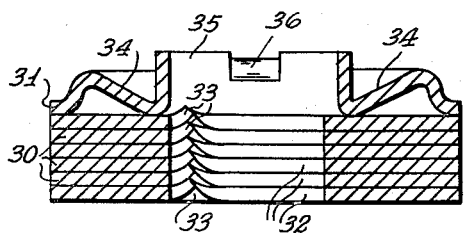
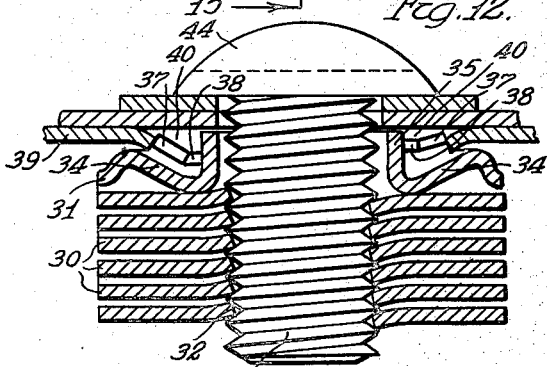
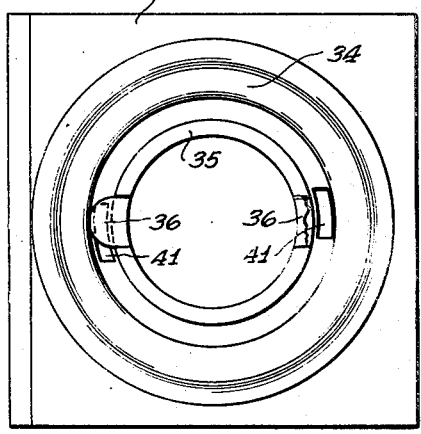
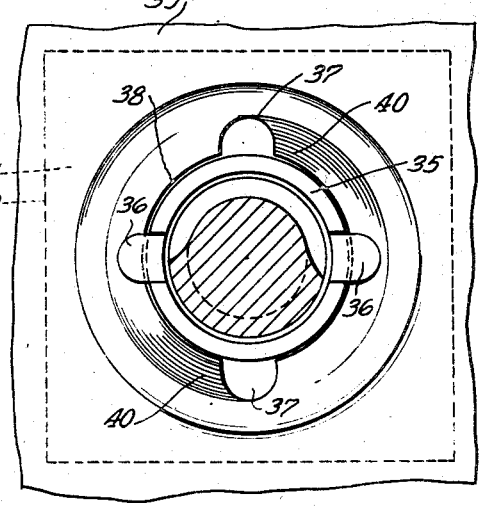
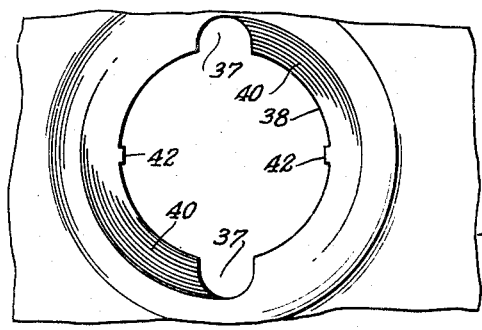
INVENTOR.
James P. Burke
BY
ATTORNEY.

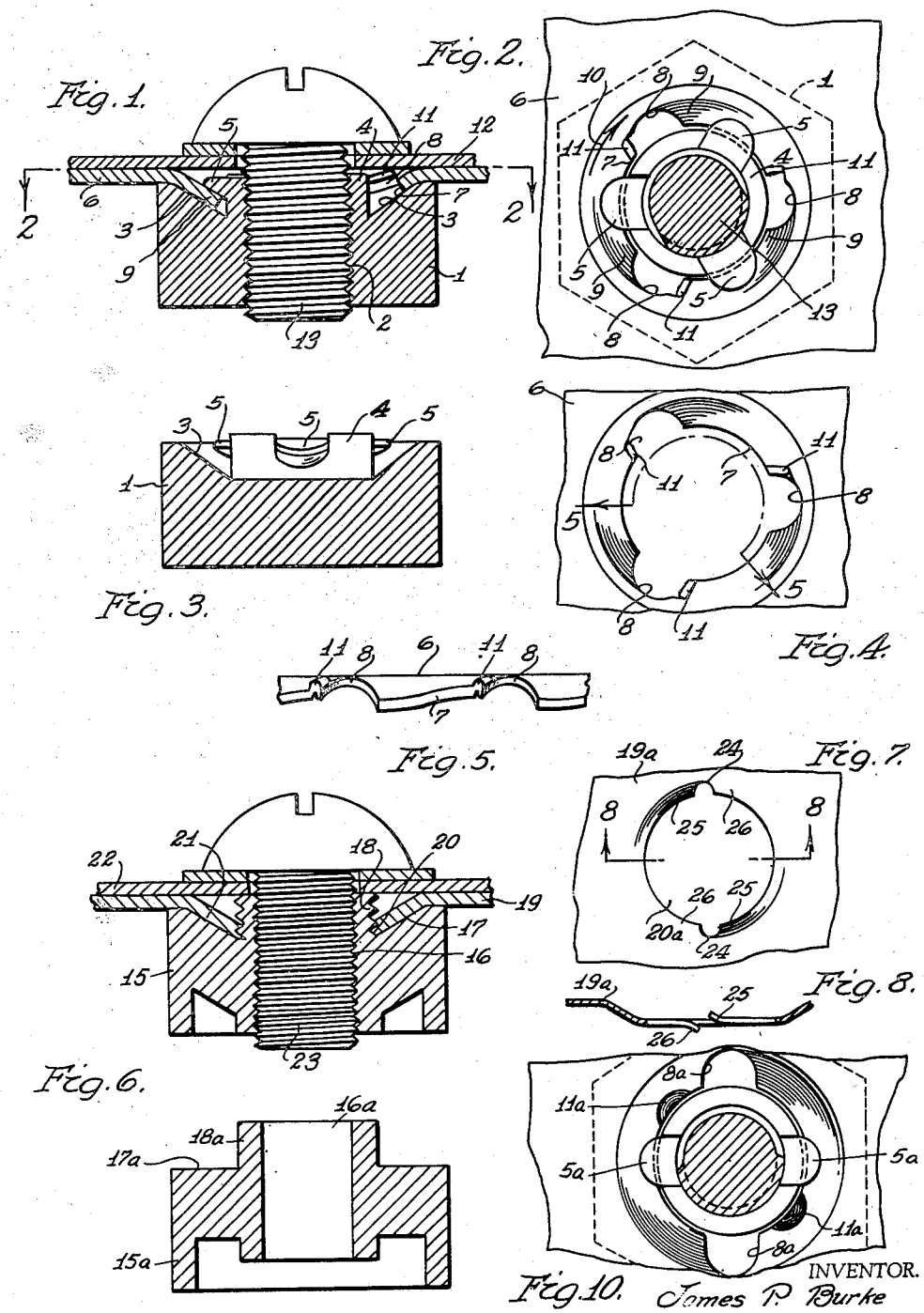

Patented July 4, 1939

2,164,382

UNITED STATES PATENT OFFICE 2,164,382

NUT

James P. Burke, Knoxville, Tenn.

Application March 6, 1939, Serial No. 260,061

13 Claims. (Cl. 85—32)

This invention relates to nuts and has for its object to provide a nut having means for retaining it on one of a plurality of members to be secured together in order to avoid the necessity of manually holding the nut against rotation when a screw is inserted therein, and in order that said nut may serve as a locating means for the screw and the members secured to the first member by the screw.

In the fabrication of various constructions, particularly automobile bodies, it is the practice to first secure the nut on one of the plurality of members to be secured together, to avoid the necessity of holding the nut against rotation, and to enable use of a bolt and nut in cases where the fabrication is such as to prevent access to the nut by a wrench. The nut may also serve as a locating means for the members secured together.

The usual practice is to provide a nut and an aperture so shaped that rotation of the nut in the aperture is impossible. After insertion of the nut in the opening a portion thereof is clinched over or riveted to prevent removal from the opening. With such an arrangement it is necessary in the case of fabrication of an automobile body to insert the nuts in apertures in the body panels and to convey the panels to a clinching press where they are individually clinched. This operation is time consuming and expensive, and exposes the panels to damage by deformation or by collision with other articles.

The main object of this invention is to provide a nut capable of retaining itself in an aperture without clinching or riveting thereof. In this respect a nut is provided having means which coacts with the walls of an aperture receiving the nut to hold the nut against removal from the aperture, and against rotation in the aperture.

Another object is to provide a nut having retaining means for confining a portion of the member to which it is to be secured in such manner as to induce a high degree of friction tending to prevent removal of the nut from said member.

Another object is to provide a nut having a conical recess or seat in one end thereof and means for engaging a portion of a sheet metal member to crowd said portion against said seat and to thereby retain the nut on said member.

Another object is to provide a nut having a stem portion surrounded by a conical seat and adapted to be inserted through an aperture in a sheet metal member, said stem having means thereon for crowding the metal surrounding said opening against said seat to retain the nut on said member, and to induce sufficient friction to prevent rotation of the nut. In this respect the invention teaches alternative means for retaining the nut, in one case inducing friction by a cam-like action and in another by means of screw-threads.

Another object is to provide a nut having coacting retaining means including cam-like elements and embodying means for preventing movement past the high point of the cam elements in the presence of an excessive force.

Another object is to provide a nut having coacting means rendered operative by rotation of the nut for securing the nut to a member, and means for preventing rotation in either direction when the coacting means are operative.

Another object is to provide a nut of this character which is composed of a series of laminations adapted to be distorted by insertion of a screw therein in order that the inherent resiliency of the laminations induces friction tending to prevent removal of the screw.

Other objects and advantages will become more fully apparent as reference is had to the accompanying drawings wherein my invention is illustrated, and in which:

Fig. 1 is a longitudinal section illustrating a plurality of elements secured together;

Fig. 2 is a view taken on the line 2—2 of Fig. 1;

Fig. 3 is a view showing the nut partially in section and partially in elevation;

Fig. 4 is a fragmental elevation illustrating the aperture for receiving the nut;

Fig. 5 is a deleveoped view of the aperture wall, taken on the line 5—5 of Fig. 4;

Fig. 6 is a section similar to Fig. 1, illustrating an alternative means for retaining the nut on a panel member;

Fig. 7 illustrates an alternative aperture formation for use with a nut such as shown in Fig. 6;

Fig. 8 is a section taken on the line 8—8 of Fig. 7;

Fig. 9 is a section of the blank from which the nut in Fig. 6 is formed;

Fig. 10 is a view similar to Fig. 2, illustrating a variation in the number of nut retaining members;

Fig. 11 is a section illustrating a nut formed of a plurality of laminations of sheet-like metal;

Fig. 12 is a section illustrating the laminated nut in use;

Figs. 13 and 14 are views taken on lines 13—13 and 14—14, respectively, of Fig. 11;

Figs. 15 and 16 are sections on lines 15—15 and 16—16, respectively, of Fig. 12, and Fig. 17 is a fragmentary view illustrating the aperture for receiving the laminated nut.

With reference to Figs. 1 to 5, 1 designates the main body portion of a nut, of hexagonal or other suitable shape, having a screwthreaded bore 2 extending centrally therethrough. In one end of the body 1 is a recess 3 of conical shape, and centrally of the recess, surrounding the bore 2, is a stem 4. The stem 4 has radial arms 5 struck therefrom with their ends in spaced relation to the surface of the conical recess 3.

The element 6, to which the nut is to be secured, has an aperture 7 with radial extensions 8, the aperture 7 having a diameter permitting insertion of the stem 4 therein and the extensions 8 being proportioned to permit the radial arms 5 to pass therethrough. Adjacent the aperture 7 the element 6 is shaped to provide a plurality of cams 9, the cams 9 having their lower ends disposed to permit rotation of the arms 5 in the direction of the arrow 10, and their high ends disposed to prevent rotation of the arms 5 in the reverse direction.

After insertion of the stem 4 into the aperture 7 the nut is rotated in the direction of the arrow 10 and the arms 5 ride against the higher cam portions to create a substantial amount of friction to oppose removal of the nut. The arms 5 also act to compress a substantial portion of the element 6 between themselves and the surface of the conical recess 3. To prevent the arms 5 from passing completely over the cams 9 and into register with the next succeeding aperture extensions 8, in the presence of an excessive rotating force, projections 11 are provided at the higher ends of the cams and function as positive stops.

After the nut has been secured to the element 6 the latter may be placed in any desired fabrication, and may have any number of elements such as the one 12 secured thereto by a screw 13 whose end engages in the screw threaded bore 2 of the nut.

As shown in Figs. 1 to 5 there are three arms 5 and three corresponding aperture extensions 8. This number was chosen for purposes of example and might be varied either by increasing or decreasing the number of arms, as in Fig. 10, wherein two arms 5a and two aperture extensions 8a are provided. To prevent retrograde rotation of the nut, depressions 11a are provided into which the arms 5a snap.

The nut shown in Fig. 6 comprises a main body portion 15 having a central screwthreaded bore 16, a conical recess 17 in one end thereof, and an externally screwthreaded stem 18 disposed in the recess 17. The element 19 to which the nut is to be secured has a screwthreaded opening 20 and a concavo-convex conical portion 21 surrounding said aperture. When the stem 18 is screwed into the aperture 20, the threads on the stem tend to compress the concavo-convex formation 21 against the wall of the recess, which confines the formation 21 and prevents distortion such as would permit stripping of the threads. This relationship also sets up a jambing or wedging action which induces sufficient friction to retain the nut on the element 19. Other elements such as the one 22 are subsequently secured to the element 19 by a screw 23 which engages the nut 15.

It will be noted upon reference to Fig. 6 that the nut 15 is screwed into the aperture 20 from the side opposite to which the screw is screwed into the nut. Therefore, if the stem 18 has right hand threads its removal from the aperture 20 will be caused by rotative movement in the same direction as the movement necessary to screw a screw with right hand threads into the nut. Thus, screwing of the screw into the nut ordinarily tends to loosen the nut, and to correct this condition the stem 18 is provided with left hand screw threads in the case of a screw having right hand threads. The threads on the screw 23 are shown as right hand threads in Fig. 6, and the threads on the stem 18 are intended to represent right hand threads.

As shown in Fig. 6 the threads on the stem 18 are larger than the threads on the screw 23, which makes it impossible for the nut to loosen of its own accord even though right hand threads are present in both cases. To permit rotation of the nut relative to the threads 20 the nut must move lengthwise a distance greater than the lengthwise distance resulting from an equal amount of rotation relative to the screw, which results in a binding action.

With the arrangement shown in Fig. 6 it is necessary to tap the aperture 20 to provide screwthreads therein. This operation may be avoided by the construction shown in Figs. 7 and 8, in which case the element 19a has an aperture 20a therein and a slit 24 therein extending radially from the aperture. On one side of the slit 24 the metal is bent upwardly as at 25, and at the other side it is bent downwardly at 26. The metal of the element 19a has less thickness than the distance between two threads and the bent portions 25 and 26 provide a lead for threads in order that the stem 18 may be screwed into the aperture.

In Fig. 9 there is shown a blank 15a from which the nut 15 is made. After providing screwthreads on the stem 18a the nut is compressed axially so that the normally flat wall 17a becomes depressed to form the conical recess 17. This disposes the screwthreads on the stem 18 within the recess 3, after which the bore 16a is tapped to complete the nut.

The nut shown in Figs. 11 to 17 instead of being solid as in the case of the nut 1 is composed of a plurality of laminations 30 of sheet metal. The several laminations 30 are formed by reversely bending a continuous strip upon itself so that each lamination is connected at opposite ends to the laminations on opposite sides thereof. With the exception of the top lamination 31 which is of special form, the laminations all have central apertures 32 and the laminations are so formed that the several apertures are coaxial. Each lamination is pierced and bent at 33 to provide a screw lead in order that each aperture wall may constitute a screw thread.

The uppermost lamination 31 is bent to form a conical seat 34 and an axial stem 35. The stem 35 is pierced and has severed portions bent outwardly to form arms 36 which are insertable through extensions 37 of an aperture 38 in a panel or like element 39. Adjacent the aperture 38 the element 39 is bent to form cams 40 against which the arms 36 press when the nut is rotated. The nut has circumferentially elongated slots 41 into which retainer prongs 42 on the element 39 are pressed by the fingers 36 as they ride against the cams 40. The prongs 42 prevent removal of the nut.

The laminations 30 are formed of stock having less cross sectional thickness than the distance between the threads 43 on the screw 44, as may readily be seen upon reference to Figs. 12 and 15. As the screw is screwed into the nut, the bent portions 33 constitute the lead necessary to permit entrance of the thread 43 into the several apertures 32. As the thread 43 enters the apertures, the several laminations 30 are caused to spread apart, and, therefore, to crowd against the thread walls thus setting up a very substantial locking friction.

What is claimed is:

1. A nut having an endwise projecting stem and a concave seat surrounding said stem, said stem being insertable through an aperture in a sheet member, and means on said stem for crowding the portion of said member surrounding said aperture against said concave seat when said nut is rotated in said aperture.

2. A nut having an endwise projecting stem and a concave seat surrounding said stem, said stem being insertable through an aperture in a sheet member, and means on said stem for crowding the portion of said member surrounding said aperture against said concave seat when said nut is rotated in said aperture, said means comprising a radial projection on said stem insertable through an extension of said aperture, said projection being adapted to engage a portion of said member surrounding said opening incident to rotation of the nut in the aperture to crowd said portion against said seat.

3. A nut having an endwise projecting stem and a concave seat surrounding said stem, said stem being insertable through an aperture in a sheet member, and screwthreads on said stem adapted to coact with screwthreads in said aperture for pressing the portion of said member surrounding the aperture against said seat.

4. A nut having an endwise projecting stem and a concave seat surrounding said stem, said stem being insertable through an aperture in a sheet member, means on said stem for crowding the portion of said member surrounding said aperture against said concave seat when said nut is rotated in said aperture, and means for limiting rotative movement of said nut in the aperture.

5. A nut having an endwise projecting stem and a concave seat surrounding said stem, said stem being insertable through an aperture in a sheet member, means on said stem for crowding the portion of said member surrounding said aperture against said concave seat when said nut is rotated in said aperture, and means for preventing retrograde rotation of the nut in the aperture.

6. A nut having an endwise projecting stem and a concave seat surrounding said stem, said stem being insertable through an aperture in a sheet member, means on said stem for crowding the portion of said member surrounding said aperture against said concave seat when said nut is rotated in said aperture in one direction, and said nut having a screwthreaded bore with the lead angle of its threads opposite to said direction of rotation of the nut.

7. A nut having an endwise projecting stem and a concave seat surrounding said stem, said stem being insertable through an aperture in a sheet member, and screwthreads on said stem adapted to coact with screwthreads in said aperture for pressing the portion of said member surrounding the aperture against said seat, and said nut having a screwthreaded bore with the lead angle of its threads opposite to the lead angle of the screw threads on said stem.

8. A nut having an endwise projecting stem and a concave seat surrounding said stem, said stem being insertable through an aperture in a sheet member, screwthreads on said stem adapted to coact with screwthreads in said aperture for pressing the portion of said member surrounding the aperture against said seat, and said nut having a screwthreaded bore with the pitch angle of the threads smaller than the pitch angle of the threads on said stem.

9. A nut composed of a plurality of interconnected sheet metal laminations having aligned apertures, said laminations being slitted and bent adjacent the apertures to provide lead portions to enable each lamination to function as a thread, said laminations each having a thickness not exceeding the width of the threads of a screw inserted in said nut.

10. A nut comprising a strip of material folded upon itself a plurality of times and pierced to form a single axis opening through all of said folds, said folds being constructed and arranged to form threads for said opening, said folds each having a thickness less than the width of the threads of a bolt inserted in said opening whereby said folds separate upon screwed insertion of said bolt.

11. A nut composed of a plurality of interconnected sheet metal laminations having aligned apertures, said laminations being slitted and bent adjacent the apertures to provide lead portions to enable each lamination to function as a thread, said laminations each having a thickness not exceeding the width of the threads of a screw inserted in said nut, one of the end laminations being bent to form a projecting stem and a concave seat surrounding the stem, said stem being insertable in an aperture in a sheet member, and means on said stem for crowding the portion of the member surrounding said aperture against said seat.

12. A nut composed of a plurality of interconnected sheet metal laminations having aligned apertures, said laminations being slitted and bent adjacent the apertures to provide lead portions to enable each lamination to function as a thread, said laminations each having a thickness substantially the width of the threads of a screw inserted in said nut.

13. A nut composed of a plurality of interconnected sheet metal laminations having aligned apertures, said laminations being slitted and bent adjacent the apertures to provide lead portions to enable each lamination to function as a thread, said laminations each having a thickness substantially the width of the threads of a screw inserted in said nut, one of the end laminations being bent to form a projecting stem and a concave seat surrounding the stem, said stem being insertable in an aperture in a sheet member, and means on said stem for crowding the portion of the member surrounding said aperture against said seat.

JAMES P. BURKE.